INVENTOR
ORVILLE L. DUBIE

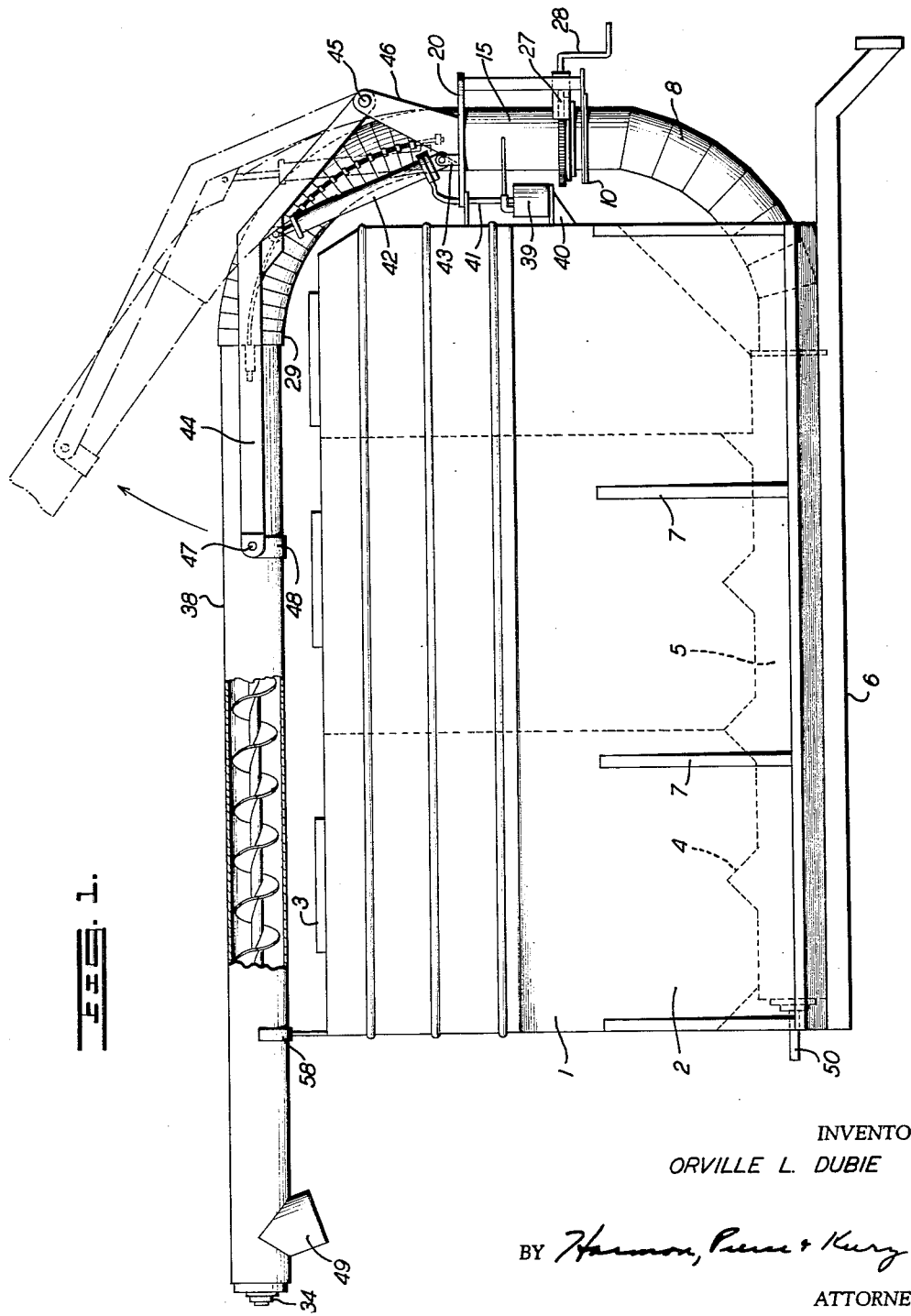

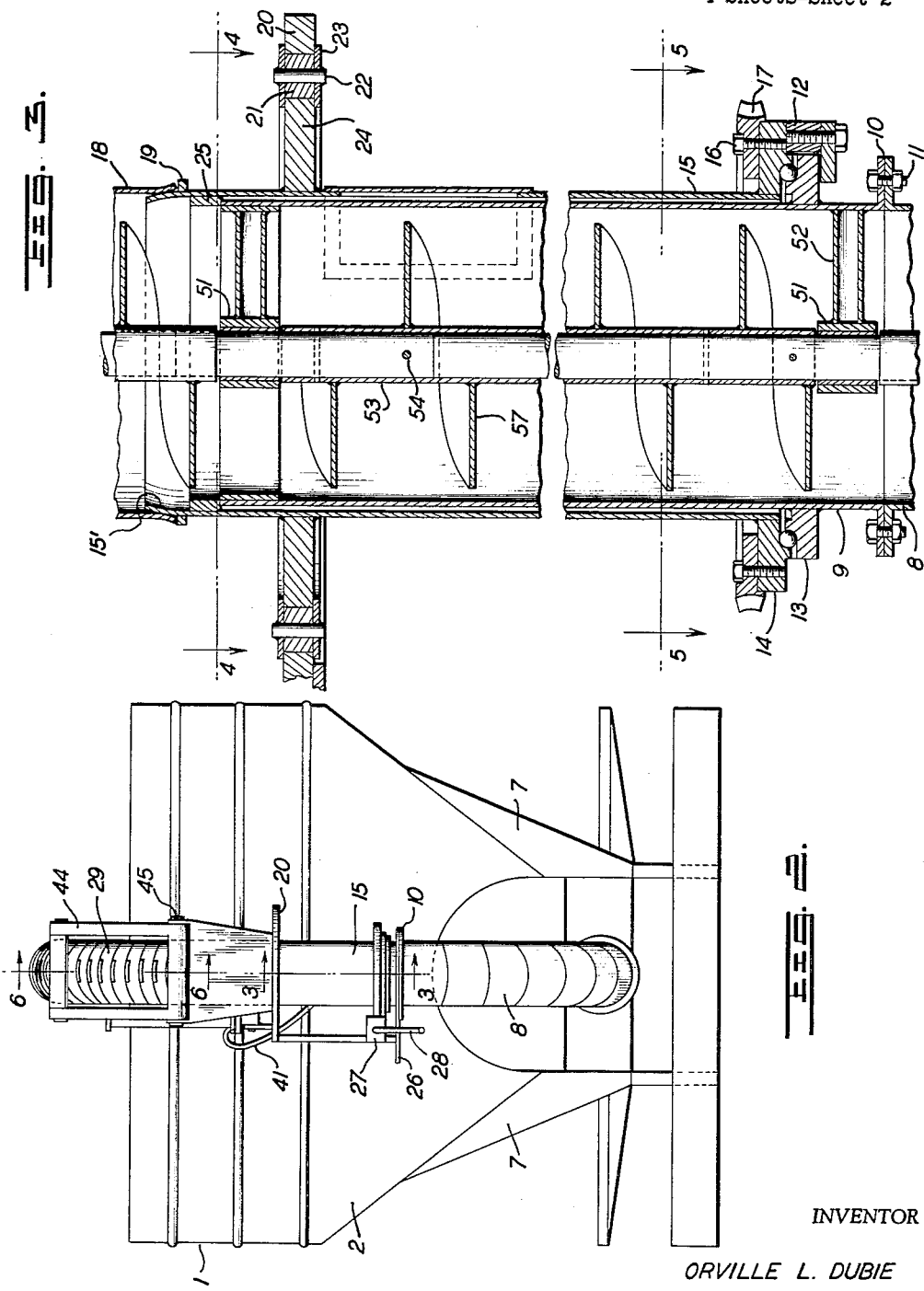

BY *Harmon, Pierce & Kurz*

ATTORNEY

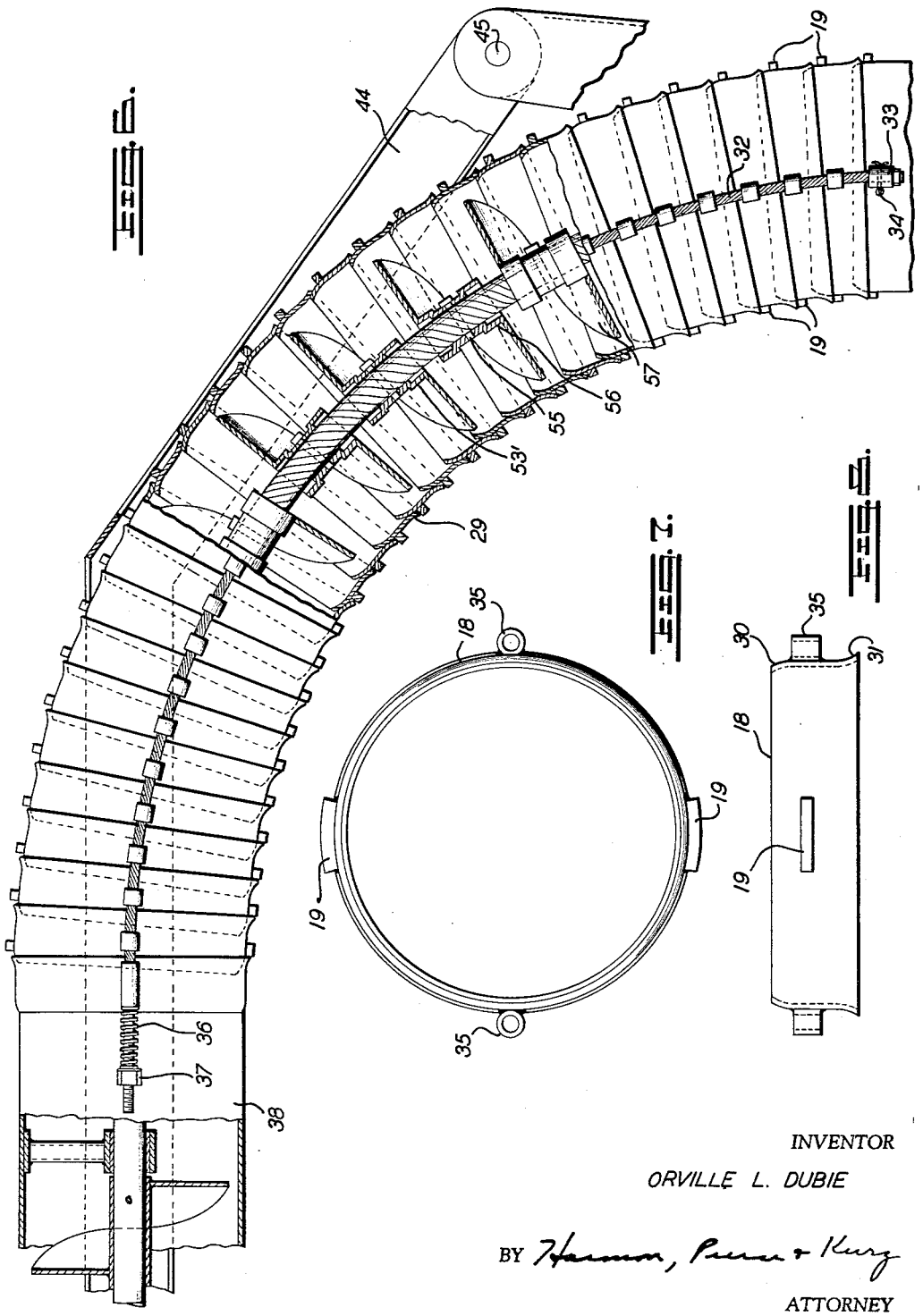

ated June 4, 1963

3,092,241
BULK TRUCK WITH FLEXIBLE CONVEYOR
Orville Louis Dubie, P.O. Box 671, Toccoa, Ga.
Filed Oct. 13, 1959, Ser. No. 846,119
5 Claims. (Cl. 198—213)

This invention pertains generally to conveyors and more particularly to improvements in flexible screw conveyors for handling and conveying dry granular or pulverulent material.

The primary object of this invention is to provide a flexible conveyor which is capable of delivering material efficiently to any discharge point within the range of the conveyor while avoiding the necessity of plural conveyors prevalent in the prior art.

A specific object of this invention is to provide a novel drive structure to position the discharge spout of a flexible screw conveyor in substantially any position or height relative to the source of material to be conveyed.

Another object of this invention is to provide an improved conveyor structure with at least a portion of the casing being flexible and having mounted concentrically therein a flexible rotatable shaft supporting a plurality of flights forming a screw conveyor.

A further object of this invention is to provide novel sleeve means for supporting a helical flight member on the flexible portion of the rotating shaft of the screw conveyor.

A still further object of this invention is to provide a durable, efficient, flexible conveyor which will be simple and easy to manufacture and which can be placed upon the market at a reasonable cost.

With these objects and other features and advantages of the invention in mind, which will appear from the following description and claims taken in connection with the drawings, the invention consists in the novel construction, arrangement and formation of parts wherein:

FIGURE 1 is a partially sectioned elevation view of the conveyor of this invention as applied to a bulk truck shown only in fragmentary form and having unrelated parts shown by dashed lines;

FIGURE 2 is an end elevation view of the bulk truck and conveyor of FIGURE 1;

FIGURE 3 is a fragmentary detailed vertical sectional view taken on line 3—3 of FIGURE 2;

FIGURE 6 is an enlarged fragmentary view, portions being detailed in section and taken on line 6—6 of FIGURE 2;

FIGURE 7 is an end elevation view of one of the plurality of spring loaded telescoping members of the flexible casing, and FIGURE 8 is an elevation view of the spring loaded telescoping member of the flexible casing.

Figure 4:
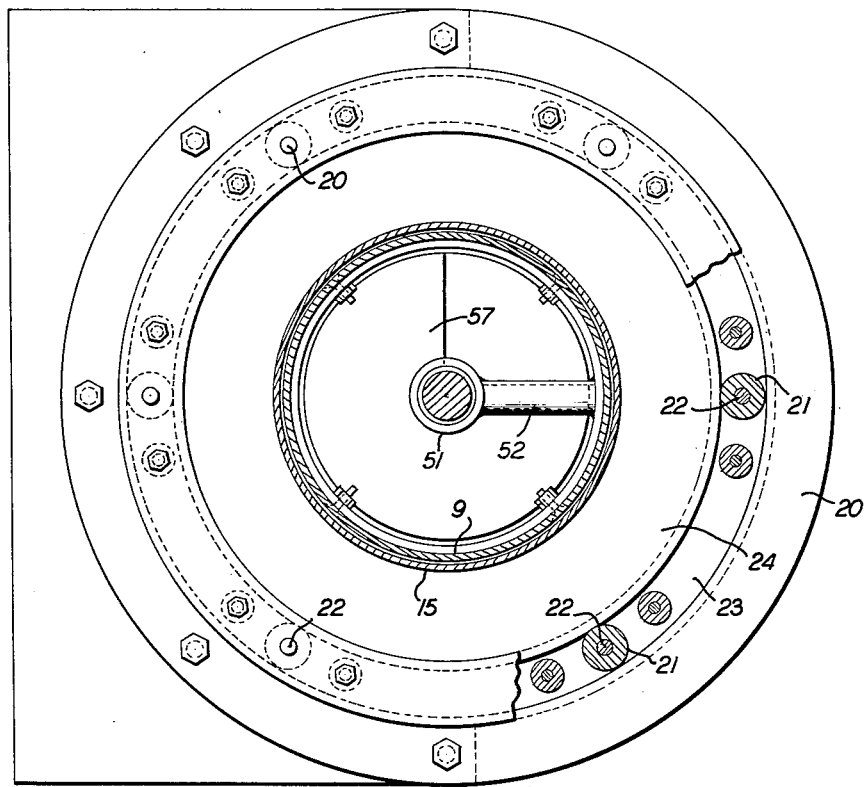
FIGURE 4 is a fragmentary, partially sectioned view taken on line 4—4 of FIGURE 3.

Referring to FIGURES 1 and 2 the bulk truck 1 consists of a plurality of storage bins 2 having opening means 3 at the top for filling the bins 2 with the materials to be stored. Each of the bins 2 have at the bottom, trap means 4, to allow the material to flow by means of gravity into the lower casing section 5. The storage bins 2 are mounted on the support 6 which is adapted to be mounted on wheels or to rest on the ground. The bins 2 are attached to the mounting support 2 by means of a plurality of support webs 7. The storage means and supporting structure may be varied and are in no way related to the novelty of the apparatus of this invention, and hence the bins and traps are not illustrated in detail. The conveyor portion of the bulk truck 1 has a lower horizontal casing section 5 being cylindrical in shape and being made of any rigid non-corrosive metal with top openings corresponding to the trap means 4 of the storage bins 2.

Rigidly attached to casing section 5 by any suitable fastening means is the curved casing section 8 having the same internal diameter and being made of similar material as the casing section 5 and being formed in any suitable manner to provide a smooth curve of 90°.

Figure 5:
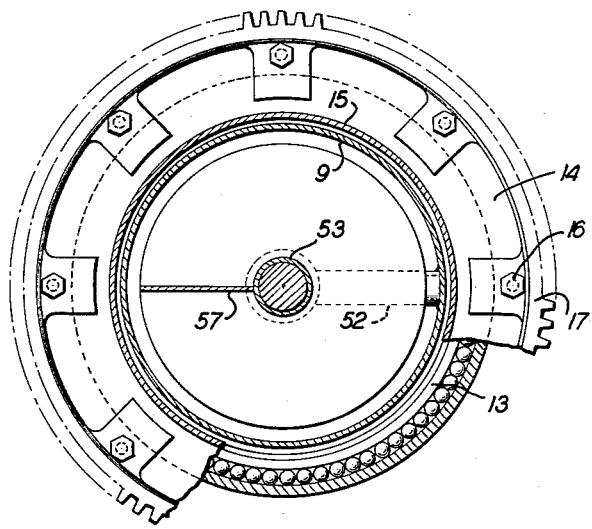
FIGURE 5 is a fragmentary, partially sectioned view taken on line 5—5 of FIGURE 3.

Referring to FIGURES 3, 4 and 5, the vertical rigid casing section 9, being the same size and of similar material as casing sections 5 and 8, is fixed to the curved casing section 8 by means of the mating flanges 10 secured together by the fastening bolts 11. Adjacent to and spaced a short distance above the mating flanges 10 is a bearing 12 having lower race 13 secured externally by any suitable means to the casing section 9. An upper race 14 is secured by any suitable means as by welding to the telscoping member 15. Telescoping member 15 is of like material as casing sections 5 and 9, but has an internal diameter substantially greater than the outside diameter of the section 9. Fixed to the upper race 14 of bearing 12 by means of studs 16 is the ring gear 17. The upper extremity 15' of the telescoping member 15 is converging in shape to mate with the diverging portion of the spring-loaded telescoping element 18. The converging section 15' of the element 15 has maximum and minimum radius stops 19 similar to those of telescoping elements 18. Adjacent to but slightly below the upper extremity of the element 15 is mounted the support bracket 20 being secured by any suitable means to the truck 1. Spaced equidistant from and adjacent to the periphery of the bracket 20, which encircles the element 15, are the guide elements 21 which are secured thereto by means of the pins 22 and the washer plates 23. Riding inside of bracket 20 and on the guides 21 is the guide plate 24 which is fixedly attached by any suitable means as by welding to the casing element 15. Adjacent to the converging section 15' of the upper extremity of casing element 15 and secured by any suitable means to the inner surface of the casing section 15 is a bearing plate 25 which rides on the upper edge of the vertical casing section 9.

Referring to FIGURE 2, attached to the joining mating flanges 10 is a support bracket 26 for a rotating drive mechanism 27, which may be of any suitable character, and is illustrated in the drawings as a manual means having a manual crank 28.

Referring to FIGURES 6, 7 and 8 the flexible casing section 29 is made up of a plurality of partially telescoping elements 18. Each of the elements 18 is formed with a converging end 30 and a diverging end 31 so shaped to be relatively movable to each other and still seal in the material being moved by the conveyor. The relative movement to one another by the elements 18 is limited by the maximum and minimum radius stops 19 which are secured as by welding to the external surface of mating elements 18 at substantially the midpoint of the vertical dimension of the elements.

When the plurality of elements 18 are assembled to form the flexible casing section 29, the pairs of stops 19 are aligned along the longitudinal diameter of the section 29, one row being substantially on the lower portion and one row being substantially opposite on the upper portion of the casing section 29 when in the operating position. Each of the stops 19 serves as a maximum or minimum radius stop depending upon the position in which the conveyor is placed.

Securing cables 32 are located on opposite sides of the section 29 to retain the plurality of telescoping mating members 18 in contact relationship with each other. The lower ends of the cables 32 are attached to the upper portion of the rigid telescoping casing member 15 by means of the lug 33 and securing cotter pin 34. The securing cables 32 are then passed through the lugs 35 which are secured to each of the mating elements 18. The upper ends of the securing cables 32 pass through the springs 36 and into the tension adjusting mechanisms 37 which are fixedly attached by any suitable means to the rigid casing section 38. Thus the several members 18 are spring-loaded in bearing contact with each other with means for adjusting the bearing loading between the mating parts.

Referring to FIGURE 1, there is rigidly attached by any suitable means to a nonmovable portion of the bulk truck 1 a mechanism for lowering or raising the upper portion of the conveyor in a horizontal plane, which may be of any suitable means and is illustrated in the drawings as an hydraulic mechanism 39 supported by the bracket 40. Leading from the operating mechanism 39 is an hydraulic line 41 which passes through the supporting bracket 20 and connects to a piston 42. The lower end of piston 42 is pivotally connected to a bracket 43 which is secured by any suitable means to the rotatable guide plate 24. The plunger end of the piston 42 is pivotally connected to the lever arm 44. Lever arm 44 at one end is pivotally connected at 45 to bracket 46 which is attached by any suitable means to the rotatable guide plate 24. At the other end, lever arm 44 is pivotally connected at 47 to the semi-circular holding band 48 which is attached by any suitable means to the rigid casing element 38. Thus when the operating means 39 is actuated by controlling the pressure to the piston 42, the rigid casing element 38 through the action of the piston 42 and the pivoted lever arm 44 may be angularly displaced in plural vertical planes relative to a horizontal axis.

The upper rigid casing section 38, having the same internal diameter and being made of similar material as the other casing sections, is secured to the flexible casing section 29 by means of the securing cables 32 at one end and has a discharge spout 49 adjacent to the other end. The discharge spout 49 may be attached to casing element 38 by any suitable means and may be of any desired length or shape.

Mounted within the multi-section casing is a driven rotatable shaft 50 having rigid sections corresponding to rigid sections 5 and 38 of the casing and flexible sections corresponding to the curved section 8 and the flexible section 29 of the casing.

Concentricity is maintained between the driven shaft 50 and the multi-section casing by means of a plurality of spaced thrust bearings 51 which are supported by the bearing supports 52 rigidly attached to the inner surface of the casing elements.

Staked to the multi-section driven shaft is a plurality of spaced sleeves 53. Referring to FIGURE 3, along the rigid sections of shaft 50 the sleeves 53 have a constant internal diameter through their entire length which is slightly larger than the outside diameter of shaft 50. Each of the sleeves 53 is slipped onto shaft 50 and staked thereto by the staking pins 54.

Referring now to FIGURE 6, the spaced sleeves 53' on the flexible cable sections of shaft 50 have an internal diameter slightly greater than the outside diameter of shaft 50 only for the center portion 55 of its length through which passes the staking pins 54; the end portions 56 of sleeves 53' have a substantially greater internal diameter than the staked center portion 55, thus increasing the overall flexibility of the flexible shaft 50, and thereby improving the flexibility of the conveyor. In other words, the sleeve length is suitable to firmly support a flight while the internal diameter of the sleeve is enlarged at its termini to allow lateral movement of the cable between the center staked portion and the termini of the sleeve.

Again referring to FIGURES 3 and 6, each of the staked sleeves 53 and 53' has fixedly attached, by any suitable means, a helical flight 57. Each of the individual helical flights 57 substantially forms one convolution. Thus when the sleeves 53 and 53' are properly spaced on the shaft 50 a substantially continuous helical screw is formed.

When the conveyor is not in operation the upper sections 29 and 38 of the casing are so positioned by operating mechanisms 46 and 39 so that the end of casing element 38 rests in the semi-circular support band 58 which is attached by any suitable means to the bulk truck 1.

In operation, a receiving receptacle such as a tank truck is positioned relatively near the bulk truck 1. An operator, by manipulating the rotating mechanism 46 and the elevating mechanism 39, positions the discharge spout 49 over the inlet of the receiving receptacle. A driving means, not shown, is actuated to drive the rotatable multiple-section shaft 50 of the screw conveyor. Trap means 4 of one of the storage bins 2 is opened, allowing the stored material to be dispensed and flow by means of gravity into the lower casing section 5 and about the screw conveyor which conducts it to the discharge spout 49.

From the foregoing description, it can be seen that the invention provides an improved simple and efficient apparatus to discharge a dry granular material to substantially an infinite number of heights and positions within the range of the combined length of casing sections 29 and 38 relative to the storage bins.

While the preferred embodiment of the invention has been illustrated and described herein, it will be understood that construction changes may be made within the scope of the appended claims without departing from the spirit of the invention.

I claim:

1. A driven multi-section screw conveyor comprising; rigid and flexible shaft sections rotatable within a housing, said shaft having secured by staking means thereto pluralities of first and second spaced sleeves, said first sleeves being staked to the rigid portion of said rotatable shaft and being of sufficient length to support a helical flight, each of said first sleeves further having a constant internal diameter throughout the entire length thereof, said second sleeves being staked to the flexible sections of said rotatable shaft and being of sufficient length to support a helical flight, said second sleeves further including center portions to provide a bearing surface through which the staking means pass, and end portions having a relatively larger internal diameter than the secured center portions for permitting increased flexibility of the rotatable shaft.

2. A flexibility screw conveyor comprising; a multi-section casing, a driven multi-section shaft concentrically mounted within said casing, said shaft having pluralities of first and second spaced sleeves staked to said shaft, said driven shaft having at least one rigid section to which said first sleeves are secured, said multi-section driven shaft including at least one flexible section having said second sleeves staked thereto with the end portions of said second sleeves having substantially enlarged internal diameters, and said first and second sleeves having helical flight members secured thereto forming a substantially continuous screw conveyor.

3. A helical flight supporting sleeve for a flexible conveyor shaft comprising; a center portion of sufficient length to provide adequate support on the shaft, said center portion having an internal diameter slightly greater than the outside diameter of the flexible shaft to which it is secured, and end portions for said sleeve having internal diameters substantially greater than the center supporting portion to allow increased flexibility of that portion of the flexible shaft within the confines of the sleeve.

4. A flexible conveyor assembly comprising; a multi-section casing including, a flexible section, a first rigid section located at one end of said flexible section and a second rigid section located at the opposite end of said flexible section, means to rotate said flexible section and said second rigid section with respect to said first rigid section, said flexible section consisting of a plurality of telescoping elements, a flexible connecting means rigidly attached to said first rigid section and interconnecting the telescoping elements, means to resiliently attach the other end of said connecting means to said second rigid section, a guide lug on each of said telescoping elements slidably surrounding said connecting means to engage said individual telescoping elements with said flexible connecting means while permitting relative movement therebetween, a rotatable flexible shaft in said casing, helical flight supporting sleeves staked to said shaft, said sleeves including a center portion of sufficient length to provide support on said shaft, said center portion having an internal diameter slightly greater than the outside diameter of the flexible shaft, and end portions for said sleeve having internal diameters substantially greater than said center supporting portion to allow increased flexibility of that portion of the flexible shaft within the confines of the sleeves.

5. A flexible conveyor comprising; a multi-section casing including a central flexible section and rigid end sections located at each end of said flexible section, said flexible section consisting of a plurality of telescoping elements, a flexible connecting means rigidly attached to one of said rigid sections for interconncting the elements, and means to resiliently attach the other end of said connecting means to the other of said rigid sections, guide lug means on each of said elements for slidably surrounding said connecting means, whereby said elements are permitted to move relative to one another and to said connecting means, and maximum and maximum radius stop means carried by each of said telescoping elements to allow an over-all displacement in a vertical plane of 180° with respect to the horizontal plane.

References Cited in the file of this patent

UNITED STATES PATENTS

| | | |
|---|---|---|
| 692,960 | Witzenman | Feb. 11, 1902 |
| 763,101 | Jones | June 21, 1904 |
| 1,063,260 | Determann | July 1, 1913 |
| 1,153,187 | Berry | Sept. 14, 1915 |
| 1,630,588 | Sperry | May 31, 1927 |
| 2,045,757 | Constantin | June 20, 1936 |
| 2,438,301 | Schulte | Mar. 23, 1948 |
| 2,438,637 | Jansen | Mar. 30, 1948 |
| 2,510,261 | Sharpe | June 6, 1950 |
| 2,633,255 | Hoffstetter | Mar. 31, 1953 |
| 2,643,680 | Kaiser | June 30, 1953 |
| 2,772,764 | McClellan | Dec. 4, 1956 |
| 2,834,452 | Richardson | May 13, 1958 |
| 2,888,128 | Allen | May 26, 1959 |
| 2,927,682 | Dorris et al. | Mar. 8, 1960 |
| 3,006,662 | Katsuhara | Oct. 31, 1961 |